May 27, 1930. A. COATS 1,760,480
ROTARY POWER TRANSMISSION MECHANISM
Original Filed Dec. 4, 1925
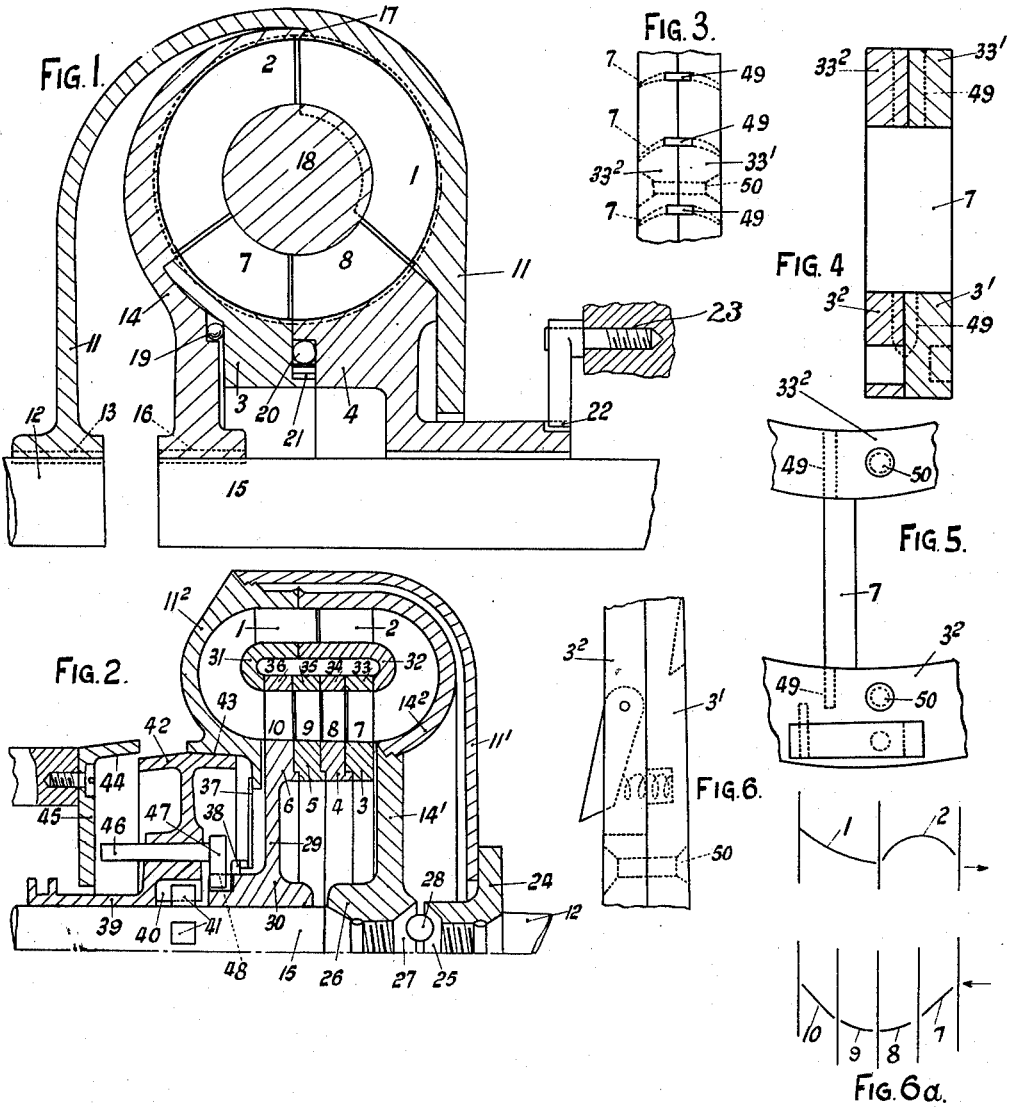

Patented May 27, 1930

1,760,480

UNITED STATES PATENT OFFICE

ALLAN COATS, OF PAISLEY, SCOTLAND

ROTARY POWER TRANSMISSION MECHANISM

Application filed December 4, 1925, Serial No. 73,183, and in Great Britain December 17, 1924.
Renewed April 14, 1930.

The invention relates to rotary mechanism for the transmission of power of the type comprising a path for fluid including rotary driving and driven vanes and guide vanes between the exit from the driven vanes and the entrance to the driving vanes.

One example of a mechanism of this type comprises an impeller vane wheel mounted on a driving shaft to which power is applied and a turbine vane-wheel mounted on a driven shaft to which power is transmitted by a fluid, the passage systems of these vane wheels being contained in a closed circuit round which the fluid circulates and guide vanes interposed between the exit from the passages in the driven vane-wheel and the entrance to the passages in the driving vane-wheel.

The invention provides a rotary mechanism for the transmission of power at varying speeds such that from any applied driving speed and torque a driven speed and torque are obtained of which the torque varies automatically in accordance with the load and the speed varies inversely as the torque, the efficiency being high throughout the whole range of speed.

In hitherto known constructions devised to obtain a difference in speed between the driving and driven shafts fixed reverse guide vanes have been interposed in the circuit between the exit from the driven vane-wheel passages and the entrance to the driving vane-wheel passages, which guide vanes reduce to a minimum the loss of energy due to shock and eddies, but with such constructions it is possible to obtain efficient transmission of power only when the difference in speed between the driving shaft and the driven shaft is some predetermined amount, and a mechanism which is efficient when running at that difference in speed between the driving shaft and the driven shaft for which the fixed guide vanes are designed becomes less and less efficient the more this predetermined difference in speed is departed from.

According to the invention the guide vanes, or the vane elements of each set of several sets of elements, are mounted on a ring which is free to move in the direction of rotation of the shafts but is restrained from movement in the reverse direction.

In practice, it is preferred to introduce in the circuit a series of adjacent concentric rings each carrying vanes so shaped and so positioned that a series of complete reverse guide vanes is formed across the rings when the rings are in correlative position, the rings being so mounted and interconnected that each ring is free to move circumferentially in one direction in advance of the immediately adjacent following ring but is restrained from movement in the reverse direction, the last ring of the series being similarly mounted in relation to a fixed anchorage.

In the accompanying drawings, Fig. 1 is a sectional elevation illustrating an example of a mechanism including two rings of guide vanes. Fig. 2 is a sectional elevation illustrating an example of a mechanism including four rings of guide vanes. Figs. 3, 4, 5 and 6 are fragmentary views of the example shown in Fig. 2 in plan, sectional elevation, side elevation and end elevation, respectively. Fig. 6$^a$ is a conventional plan view of the closed circuit.

Referring to Fig. 1, 11 is a casing keyed to the driving shaft 12, at 13, and carrying vanes 1. 14 is a casing keyed to the driven shaft 15, at 16, and carrying vanes 2 and making sliding joint with the casing 11 at 17. 3 and 4 are rings carrying vanes 7 and 8 which, together with the vanes 1 and 2 and a core ring 18 carried by the vanes 1, form a closed circuit for the operative fluid. The ring 3 is mounted on a ball bearing 19 carried by the casing 14 and the ring 4 is mounted on a ball bearing 20 carried by the ring 3. The rings 3 and 4 are operatively connected to one another by a free-wheel ratchet-gear at 21 and the ring 4 is connected through a free-wheel ratchet gear at 22 with a fixed anchorage 23.

Referring to Fig. 2, secured to a flanged boss 24, mounted on a screw-threaded portion of the driving shaft 12 is the impeller casing which is composed of two parts $11^1$ and $11^2$. The turbine casing, composed of two parts $14^1$ and $14^2$ is similarly secured to the driven shaft 15 by means of the screw-threaded boss 26. A ball thrust bearing composed of ball-races 25 and 27 and a series of balls 28 is interposed between the driving and driven shafts. Guide vane rings 3, 4, 5 and 6 are connected one with another in a manner such as has been described. The guide vane ring 6 is carried by a web 29 on a boss 30 which is freely mounted on the driven shaft 15. Secured to the impeller casing and carrying at their inner ends the part 31 of the core ring are driving vanes 1. Driven vanes 2 are secured to the turbine casing and carry at their inner ends the part 32 of the core ring. The remainder of the core ring is made up of parts 33, 34, 35 and 36 which are carried respectively by the outer ends of the guide vanes 7, 8, 9 and 10, which are in turn mounted on the rings 3, 4, 5 and 6. A flexible diaphragm 37 is secured to the return edge of the impeller casing $11^2$ and makes frictional contact with a collar 38 on the boss 30 to minimize leakage of fluid when the mechanism is at rest. Freely mounted on the driven shaft 15 is a clutch member 39, which has at one end a clutch portion 40 adapted to engage projections 41 on the shaft 15. The clutch member 39 has on it a cone clutch portion 42 adapted alternatively to engage cone faces 43 and 44 provided on the impeller casing portion $11^2$ and on an externally fixed member 45. When the clutch member 39 is moved along the shaft 15 to cause engagement of the clutch portion 40 with the projections 41, the cone clutch portion 42 moves with it into engagement with the cone face 43, thus effecting a solid transmission between the driving and the driven shafts 12 and 15 as shown in the drawing. Rods, as 46, pass freely through the clutch member 39 and are carried thereby, being prevented from endwise movement in one direction by the fixed member 45. Pawls, as 47, carried by these rods 46 are adapted to engage a ratchet 48 on the boss 30. When the clutch member 39 is moved along the shaft to disengage the clutch portion 40 from the projections 41, the cone clutch portion 42 moves out of engagement with the face 43 and into engagement with the face 44, and the clutch member 39, with the rods 46 and pawls 47, is held stationary. With the parts so disposed the pawl and ratchet gear 47, 48 permits rotary movement in one direction of the ring 6 but prevents movement in the reverse direction.

Figs. 3, 4 and 5 illustrate one method of mounting the guide vanes between rotatable rings and the core portion. As shown, the vane 7 has a tongue portion 49 at each end. The ring and the core portions are each made up of two parts $3^1$, $3^2$, and $33^1$, $33^2$, respectively, which when placed together embrace the tongue portions 49. The two portions of the ring and of the core are held together by rivets as at 50. The construction of the interconnecting pawl-and-ratchet gear between the rings is clearly shown in Figs. 5 and 6 and needs no further description.

In operation and referring now to Fig. $6^a$, when the fluid enters the ring of driven vanes 2 from the ring of driving vanes 1 its velocity in the closed circuit has both a circumferential component and an axial component, but when the driven vanes 2 are working at full capacity they extract all that energy of the fluid which is due to the circumferential component of velocity and the fluid leaves the vanes 2 with a velocity which has an axial component only, as indicated by the arrow adjacent to the vanes 2. This axial component is maintained by the shape of the casing wall and the fluid enters the return guide vanes in the direction indicated by the arrow adjacent to the vanes 7 and therefore impinges on the back of the vanes 7 which thereupon move in the direction of rotation of the shafts and offer negligible resistance to the flow of the fluid which therefore still has an axial component of velocity only when leaving the vanes 7. Similarly when the fluid encounters the vanes 8 they move forwardly but at less speed than the vanes 7 and the fluid passes across them still with an axial component of velocity only. The fluid now passes across the face of the vanes 9 and 10 which are restrained from backward movement by the pawl and ratchet gear and which alter the direction of flow so that the fluid when leaving the vanes 10 and returning to the driving vanes 1 possesses a velocity which has again both a circumferential component and an axial component.

It will be seen that with varying speeds of the driven vanes 2 varying effects on the vanes 7, 8, 9 and 10 will be produced, the effect being in each instance that the fluid enters the effective portion of the complete return guide vane at an angle which ensures minimum loss of energy due to shocks.

What I claim is:—

1. Rotary power transmission mechanism comprising a path for fluid including rotary driving vanes, a shaft connected to rotate said vanes, rotary driven vanes, a second shaft alined with the first shaft and connected to rotate with said driven vanes, and a series of return guide vanes interposed between the exit from the driven vanes and the entrance to the driving vanes, said return guide vanes being yieldable to fluid impinging on their backs and unyieldable to fluid impinging on their faces.

2. Rotary power transmission mechanism comprising a path for fluid including rotary driving vanes, a shaft connected to rotate said vanes, rotary driven vanes, a second shaft alined with the first shaft and connected to rotate with said driven vanes, and a series of return guide vanes interposed between the exit from the driven vanes and the entrance to the driving vanes, said return guide vanes being free to move circularly in the direction of rotation of the first-mentioned shaft but restrained from movement in the reverse direction.

3. Power transmission mechanism including rotary driving and driven vaned members, driving and driven shafts carrying said members respectively, a series of return guide vanes for guiding the fluid passing from said driven to said driving vaned member, the vanes of said members and said return guide vanes together presenting a circuit for fluid, rings carrying said return guide vanes, and ratchet mechanism cooperative with one of said rings permitting rotation of said last-mentioned ring in the direction of rotation of said shafts but restraining said ring from movement in the reverse direction.

4. Power transmission mechanism including rotary driving and driven vaned members, coaxial rings, a series of return guide vanes sustained by said rings for guiding the fluid passing from said driven to said driving vaned member, a fixed anchorage, means cooperative with said fixed anchorage and one of said rings permitting rotation of said ring in the same direction as said vaned members but restraining said ring from rotation in the reverse direction, and interconnections between said rings permitting each other ring to move circumferentially in advance of the immediately adjacent following ring but restraining it from movement in the reverse direction.

5. Power transmission mechanism including rotary driving and driven vaned members, coaxial rings, a series of return guide vane elements sustained by said rings for guiding the fluid passing from said driven to said driving vaned member, a fixed anchorage, a pawl and ratchet gear connection between said anchorage and one of said rings permitting rotation of said ring in the same direction as said vaned members but restraining said ring from rotation in the reverse direction, and pawl and ratchet connections between the several rings permitting each other ring to move circumferentially in advance of the immediately adjacent following ring but restraining it from movement in the reverse direction.

6. Rotary power transmission mechanism comprising a path for fluid including rotary driving vanes, a first shaft connected to rotate said vanes, rotary driven vanes, a second shaft alined with said first shaft and connected to rotate with said driven vanes, and return guide vanes interposed between the exit from said driven vanes and the entrance to said driving vanes, said return guide vanes being yieldable to fluid impinging on their backs and unyieldable to fluid impinging on their faces.

7. Rotary power transmission mechanism comprising a path for fluid including rotary driving vanes, a first shaft connected to rotate said vanes, rotary driven vanes, a second shaft alined with said first shaft and connected to rotate with said driven vanes, and return guide vanes interposed between the exit from said driven vanes and the entrance to said driving vanes, said return guide vanes being free to move circularly in the direction of rotation of said shafts but restrained from movement in the reverse direction.

8. Rotary power transmission mechanism comprising a path for fluid including rotary driving vanes, a first shaft connected to rotate said vanes, rotary driven vanes, a second shaft alined with said first shaft and connected to rotate with said driven vanes, return guide vanes interposed between the exit from said driven vanes and the entrance to said driving vanes, and a member coaxial with said shafts, said member carrying said return guide vanes and being free to move in the direction of rotation of said shafts but restrained from movement in the reverse direction.

9. Rotary power transmission mechanism comprising a path for fluid including rotary driving vanes, a first shaft connected to rotate said driving vanes, rotary driven vanes, a second shaft alined with said first shaft and connected to rotate with said driven vanes, and return guide vanes interposed between the exit from said driven vanes and the entrance to said driving vanes, each complete return guide vane comprising a plurality of vane elements in series, said return guide vane elements being yieldable to fluid impinging on their backs and unyieldable to fluid impinging on their faces.

10. Rotary power transmission mechanism comprising a path for fluid including rotary driving vanes, a first shaft connected to rotate said vanes, rotary driven vanes, a second shaft alined with said first shaft and connected to rotate with said driven vanes, return guide vanes interposed between the exit from said driven vanes and the entrance to said driving vanes, a member coaxial with said shafts and carrying said return guide vanes, and ratchet means permitting rotation of said member in the direction of rotation of said shafts but restraining rotation of said member in the reverse direction.

11. Rotary power transmission mechanism comprising a path for fluid including rotary driving vanes, a first shaft connected to rotate said vanes, rotary driven vanes, a second shaft alined with said first shaft and connected to rotate with said driven vanes, return guide vanes interposed between the exit from said driven vanes and the entrance to said driving vanes, and means for permitting said return guide vanes to yield in the direction of turning of the said shafts and restrain them from yielding in the reverse direction.

12. Power transmission mechanism including rotary driving and driven vaned members, a fixed anchorage, return guide vanes for guiding the fluid passing from said driven to said driving vaned member, and means for connecting said return guide vanes to said fixed anchorage and permitting said vanes to yield in the direction of rotation of the driving and driven members but restraining them from yielding in the reverse direction.

In testimony whereof I have signed my name.

ALLAN COATS.